United States Patent
Abraham et al.

(10) Patent No.: US 9,454,454 B2
(45) Date of Patent: Sep. 27, 2016

(54) MEMORY LEAK ANALYSIS BY USAGE TRENDS CORRELATION

(71) Applicant: Microsoft Corporation, Redmond, WA (US)

(72) Inventors: Arun Mathew Abraham, Redmond, WA (US); Brian Robert Crawford, Seattle, WA (US); Daniel Vann, Duvall, WA (US); Jing Fan, Redmond, WA (US); Douglas Jay Rosen, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 186 days.

(21) Appl. No.: 14/481,687

(22) Filed: Sep. 9, 2014

(65) Prior Publication Data
US 2016/0070633 A1   Mar. 10, 2016

(51) Int. Cl.
| | |
|---|---|
| *G06F 11/00* | (2006.01) |
| *G06F 11/34* | (2006.01) |
| *G06F 11/36* | (2006.01) |
| *G06F 12/02* | (2006.01) |
| *G06F 9/50* | (2006.01) |

(52) U.S. Cl.
CPC ......... *G06F 11/3452* (2013.01); *G06F 9/5016* (2013.01); *G06F 11/34* (2013.01); *G06F 11/3604* (2013.01); *G06F 11/3612* (2013.01); *G06F 12/0253* (2013.01)

(58) Field of Classification Search
CPC ........... G06F 11/3452; G06F 11/3612; G06F 11/3604; G06F 9/5016
See application file for complete search history.

(56) References Cited

U.S. PATENT DOCUMENTS

| | | |
|---|---|---|
| 7,447,694 B2 | 11/2008 | Mitchell |
| 8,522,216 B2 | 8/2013 | Otenko |
| 2006/0206885 A1 | 9/2006 | Seidman et al. |
| 2006/0277440 A1 | 12/2006 | Minshall et al. |
| 2008/0046673 A1 | 2/2008 | Hwang |
| 2011/0066897 A1 | 3/2011 | Bumgarner et al. |
| 2011/0276833 A1 | 11/2011 | Otenko |

(Continued)

OTHER PUBLICATIONS

"International Search Report & Written Opinion Issued in PCT Application No. PCT/US2015/048749", Mailed Date: Nov. 26, 2015, 11 Pages.

(Continued)

*Primary Examiner* — Philip Guyton
(74) *Attorney, Agent, or Firm* — Kevin Sullivan; Kate Drakos; Micky Minhas

(57) ABSTRACT

Tools and techniques assist developers with the detection of memory leaks by using correlation of data type memory usage trends. In particular, investigations of memory leaks can be prioritized without always resorting to the use of bulky and performance-degrading memory dumps, by using these tools and techniques to identify leaky correlated data types. Data about a program's memory usage is processed to identify memory usage trends over time for respective data types, and the trends are searched for significant correlations. Correlated trends (and hence their corresponding data types) are grouped. Memory usage analysis information is displayed for grouped data types, such as the names of the most rapidly leaking data types, the names of correlated data types, leak rates, and leak amounts in terms of memory size and/or data object counts. Memory usage data may also be correlated with processing load requests to indicate which requests have associated memory leaks.

20 Claims, 7 Drawing Sheets

(56) References Cited

U.S. PATENT DOCUMENTS

| | | | |
|---|---|---|---|
| 2011/0276949 A1* | 11/2011 | Otenko | G06F 11/3452 717/131 |
| 2012/0216076 A1* | 8/2012 | Macik | G06F 11/3612 714/38.1 |
| 2013/0211762 A1 | 8/2013 | Taskov | |
| 2016/0070633 A1* | 3/2016 | Abraham | G06F 11/3612 714/47.3 |

OTHER PUBLICATIONS

"Java Memory Leaks", Dec. 11, 2012, retrieved from <<http://javabook.compuware.com/content/memory/problem-patterns/memory-leaks.aspx>>, 4 pages.

"WebSphere Application Server Memory Leak Detection and Analysis: Part 2: Tools and Features for Leak Detection and Analysis", Published on: Sep. 18, 2012, retrieved from <<http://www.programmershare.com/2539575/>>, 10 pages.

Shabrin S., et al., "Memory Leak Detection in Distributed System", In Proceedings of World Academy of Science, Engineering and Technology, vol. 2, Apr. 20, 2008, pp. 719-724.

"BoundsChecker", retrieved from <<http://en.wikipedia.org/wiki/BoundsChecker>>, Apr. 9, 2014, 3 pages.

"DynamoRIO", retrieved from <<http://en.wikipedia.org/wiki/DynamoRIO>>, Jan. 7, 2014, 4 pages.

"Garbage collection (computer science)", retrieved from <<http://en.wikipedia.org/wiki/Garbage_collection_(computer_science)>>, Jul. 31, 2014, 8 pages.

"Rational Purify", retrieved from <<http://en.wikipedia.org/wiki/IBM_Rational_Purify>>, May 26, 2014, 6 pages.

"Insure++", retrieved from <<http://en.wikipedia.org/wiki/Insure%2B%2B>>, Mar. 9, 2014, 2 pages.

"Memory debugger", retrieved from <<http://en.wikipedia.org/wiki/Memory_debugger>>, Jun. 30, 2014, 6 pages.

"Memory leak", retrieved from <<http://en.wikipedia.org/wiki/Memory_leak>>, Jul. 24, 2014, 7 pages.

"Memwatch", retrieved from <<http://en.wikipedia.org/wiki/Memwatch>>, Mar. 4, 2014, 1 page.

"Microsoft Visual Studio", retrieved from <<http://en.wikipedia.org/wiki/Microsoft_Visual_Studio>>, Jul. 27, 2014, 13 pages.

"Tracing VirtualAlloc With Xperf—MozillaWiki", retrieved from <<https://wiki.mozilla.org/Tracing_VirtualAlloc_With_Xperf>>, Jan. 10, 2014, 4 pages.

"Valgrind", retrieved from <<http://en.wikipedia.org/wiki/Valgrind>>, Jul. 6, 2014, 5 pages.

"Windows Performance Toolkit—Xperf", retrieved from <<http://blogs.msdn.com/b/ntdebugging/archive/2008/04/03/windows-performance-toolkit-xperf.aspx>>, Apr. 3, 2008, 5 pages.

\* cited by examiner

| Type | Count | Size |
|---|---|---|
| System.String | 20,347 | 344,980,900 |
| System.Char[] | 15,780 | 233,811,008 |
| MS.VS.ITest | 1,250 | 87,234,219 |

MEMORY LEAK ANALYSIS BY USAGE TRENDS CORRELATION

BACKGROUND

Memory leaks are a common error in computer programming. They occur when memory is apparently or actually allocated for use by a program, but is not being used and will not be used because it has not been freed for use. Hence, the memory may become effectively unavailable for computational use until the process restarts and/or the computing system reboots and all of the memory not taken by the system and other processes is again marked as available for use. Leaks reduce the total amount of available memory, which ultimately reduces or terminates the functionality of software running on the system until the system is again rebooted. The memory leaked is most frequently user-space random access memory (RAM), but other types of memory such as kernel RAM and hard disk storage are also subject to leaks.

SUMMARY

Some embodiments are directed to the technical problem of detecting memory leaks. Some are directed to the technical problem of providing software developers with information that assists identification of the specific causes of memory leaks in a particular program. Some are directed to both problems and/or to other problems apparent to one of skill in the computing arts.

Some of the embodiments help improve the functioning of a computer (i.e., a device with at least one processor and memory) by assisting detection of memory leaks in a software program which runs on the computer. The software program has a processing load and uses memory. Data about the program's memory usage is obtained. The memory usage data includes memory usage samples which collectively specify a plurality of data types. Each memory usage sample specifies a value of at least one usage statistic for at least one of the data types at a specified sample time.

Some embodiments computationally identify memory usage trends over time for a plurality of the data types, by processing at least part of the memory usage data with a processor. With at least two such trends identified, these embodiments computationally search for correlations between data type memory usage trends. When correlations are found, correlated trends (and hence their corresponding data types) are grouped. That is, the embodiment computationally groups data types into memory-usage-trend-correlated groups. Data types in a given group tend to behave similarly with regard to memory usage. All data types in a given memory-usage-trend-correlated group have memory usage trends that satisfy a predetermined trend correlation criterion. Data types whose trends do not satisfy the predetermined trend correlation criterion are not in the given memory-usage-trend-correlated group. Some embodiments then display memory usage analysis information about grouped data types. For example, the names of the most rapidly leaking data types may be displayed. As another example, the embodiment may display the names of a group of data types which all showed little or no leakage at first, then all showed a spurt of leaks, and then again showed little or no leakage.

These and other examples given herein are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Acronyms and Abbreviations

Figure 1:
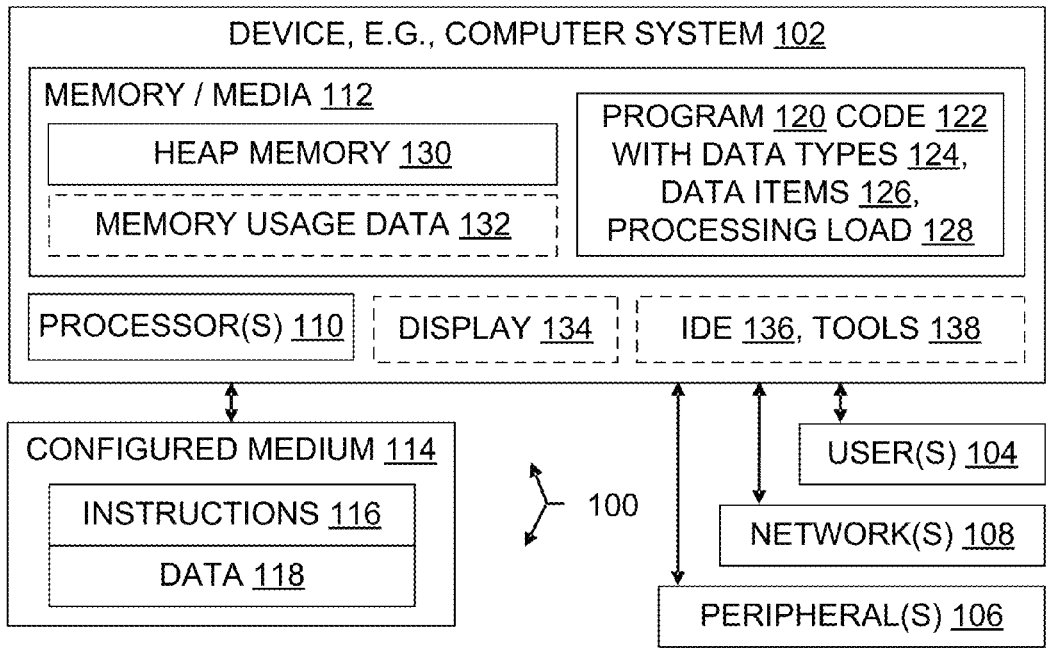
FIG. 1 is a block diagram illustrating a computer system having at least one processor and at least one memory which interact with one another under the control of software which can be analyzed for memory leaks, software which can analyze memory leaks, or both, as well as other items in an operating environment which may be present on multiple network nodes, and also illustrating configured storage medium (as opposed to mere propagated signal) embodiments.

Some acronyms and abbreviations are defined below, but others may be defined elsewhere herein or require no definition to be understood by one of skill.

ALU: arithmetic and logic unit
API: application program interface
App: application CD: compact disc
CPU: central processing unit
DVD: digital versatile disk or digital video disc
FPGA: field-programmable gate array
FPU: floating point processing unit
GC: garbage collection
GPU: graphical processing unit
GUI: graphical user interface
IDE: integrated development environment, sometimes also called "interactive development environment"
PII: personally identifiable information
RAM: random access memory
ROM: read only memory Overview Memory leak detection is a hard problem, and an important one. In many computing systems, each process gets a virtual address space. Memory leaks consume virtual address space as well as physical memory (until the memory pages get paged out to disk). For application memory leaks, restarting the process may return the allocated memory to the system, but restarts are not always convenient. In some computing systems, such as embedded systems or systems that lack separate process address spaces, returning lost memory to the system may require rebooting the entire system. Some familiar approaches rely on the collection and analysis of large memory dumps, while embodiments described here provide an alternative (or a helpful prelude) to dump analysis. Dump analysis often involves collecting memory dumps from a deployment environment and moving dump files to a development environment for analysis with memory tools. Typically, two or more dumps are collected at different points in time and differenced (a.k.a. diff'ed) to identify memory allocation tree roots that have increased sizes/counts of referenced objects. The heavy weight and complexity of this process makes memory leak detection not very approachable for average developers and one often sees this task to go the most skilled developers in the team.

One advantage of memory dumps is that they have reference graph information. With this information and enough time, one will most likely identify the source of the memory leakage problem. Dumps can also have instance information that can be useful in some analyses. For example, being able to inspect the values of a string to guess where it comes from can be useful. A drawback is that one might leak PII and so the values might not be usable in all situations.

Memory dumps also have disadvantages. The collection of dumps typically has a negative effect on the performance of the machine. So if this was done on a production server for a web app, one would see a significant drop in requests per second of the app. The dumps are also large, so they take up substantial drive space and moving them between machines decreases available network bandwidth. Memory dump analysis typically involves sifting through a memory heap tree to find the nodes that have larger than expected references, or in the case of diff'ing, to find the nodes that registered the largest increase in size/counts. This is inherently a cumbersome process. Moreover, a request load on an application often has an impact on contents of the dump and hence influences the diff process. Dump contents also vary between environments. When a reference graph is captured in a garbage collected environment, it typically does not contain references to garbage, but only objects that are live (have at least one reference). In a non-garbage collected environment, leaks of referenced memory can occur as well as leaks of unreferenced but never freed memory.

Some embodiments described herein may be viewed in a broader context. For instance, concepts such as correlation, memory usage, sampling, and trends may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving correlation, memory usage, sampling, and/or trends are outside the present scope. Accordingly, vagueness, mere abstractness, lack of technical character, and accompanying proof problems are also avoided under a proper understanding of the present disclosure.

Nature of Embodiments

The technical character of embodiments described herein will be apparent to one of ordinary skill in the art, and will also be apparent in several ways to a wide range of attentive readers. First, some embodiments address technical problems such as detecting the existence of memory leaks and providing information that helps developers more efficiently identify the source of a memory leak. Second, some embodiments include technical components such as computing hardware which interacts with software in a manner beyond the typical interactions within a general purpose computer. For example, in addition to normal interaction such as memory allocation in general, memory reads and writes in general, instruction execution in general, and some sort of I/O, some embodiments described herein identify data type memory usage trends, search for correlated data type memory usage trends, and display information about the correlations and their constituent trends and data types. Third, technical effects provided by some embodiments ultimately include the efficient improvement of software functionality by the removal of memory leaks without reliance on collection, transport, and analysis of memory dumps. Other technical effects will also be clear to those of skill in the art upon reading the present disclosure.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment.

Reference is made to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

Terminology

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are defined explicitly, but quotation marks are not used when a term is defined implicitly. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

Throughout this document, use of the optional plural "(s)", "(es)", or "(ies)" means that one or more of the indicated feature is present. For example, "processor(s)" means "one or more processors" or equivalently "at least one processor".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as allocating, analyzing, computing, correlating, deallocating, determining, displaying, estimating, fitting, graphing, grouping, identifying, indicating, normalizing, obtaining, performing, processing, sampling, satisfying, searching, specifying (or allocates, allocated, analyzes, analyzed, etc.) with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. In the United States, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting aspect combination is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked. An individual machine is a computer system, and a group of cooperating machines is also a computer system. A given computer system 102 may be configured for end-users, e.g., with applications, for administrators, as a server, as a distributed processing node, and/or in other ways.

Human users 104 may interact with the computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other interface presentations. A user interface may be generated on a local desktop computer, or on a smart phone, for example, or it may be generated from a web server and sent to a client. The user interface may be generated as part of a service and it may be integrated with other services, such as social networking services. A given operating environment includes devices and infrastructure which support these different user interface generation options and uses.

Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. Some examples of NUI technologies include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (electroencephalograph and related tools).

One of skill will appreciate that the foregoing aspects and other aspects presented herein under "Operating Environments" may also form part of a given embodiment. This document's headings are not intended to provide a strict classification of features into embodiment and non-embodiment feature classes.

As another example, a game may be resident on a Microsoft XBOX Live® server (mark of Microsoft Corporation). The game may be purchased from a console and it may be executed in whole or in part on the server, on the console, or both. Multiple users may interact with the game using standard controllers, air gestures, voice, or using a companion device such as a smartphone or a tablet. A given operating environment includes devices and infrastructure which support these different use scenarios.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments. Other computer systems not shown in FIG. 1 may interact in technological ways with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory is a signal per se.

The medium 114 is configured with instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by backup, restore, commits, aborts, reformatting, and/or other technical operations.

Although an embodiment may be described as being implemented as software instructions executed by one or more processors in a computing device (e.g., general purpose computer, cell phone, or gaming console), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. Components of an embodiment may be grouped into interacting functional modules based on their inputs, outputs, and/or their technical effects, for example.

In the illustrated environments 100, one or more programs 120 have code 122 which includes data types 124 and data items 126 (e.g., object instances, records, structs, nodes, arrays, and linked data structures). During execution, the program 120 has a processing load 128 which includes, e.g., searching, sorting, creating, updating, or otherwise computationally processing data items. The program 120 uses memory 112 to accomplish its processing, and in many cases some of that memory 112 is in the form of heap memory 130. The heap memory may be subject to automatic garbage collection and/or may be managed directly by the program 120. Other forms of memory 112 are generally also used by the program, either directly or indirectly, such as disk storage, stack memory, and kernel space memory. Usage data 132 may be collected indicating how the memory 112 (particularly the heap memory 130) is or was being used.

The code 122, usage data 132, and other items shown in the Figures and/or discussed in the text, may each reside partially or entirely within one or more hardware media 112, thereby configuring those media for technical effects which go beyond the "normal" (i.e., least common denominator) interactions inherent in all hardware-software cooperative operation. In addition to processors 110 (CPUs, ALUs, FPUs, and/or GPUs), memory/storage media 112, display(s) 134, and battery(ies), an operating environment may also include other hardware, such as buses, power supplies, wired and wireless network interface cards, and accelerators, for instance, whose respective operations are described herein to the extent not already apparent to one of skill. CPUs are central processing units, ALUs are arithmetic and logic units, FPUs are floating point processing units, and GPUs are graphical processing units.

A given operating environment 100 may include an Integrated Development Environment (IDE) 136 which provides a developer with a set of coordinated software development tools 138 such as compilers, source code editors, profilers, debuggers, and so on. Tools 138 may also be present outside any IDE 136. Some suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs.

One or more items are shown in outline form in the Figures to emphasize that they are not necessarily part of the illustrated operating environment or all embodiments, but may interoperate with items in the operating environment or some embodiments as discussed herein. It does not follow that items not in outline form are necessarily required, in any Figure or any embodiment. In particular, FIG. 1 is provided for convenience; inclusion of an item in FIG. 1 does not imply that the item, or the describe use of the item, was known prior to the current innovations.

Systems

Figure 2:
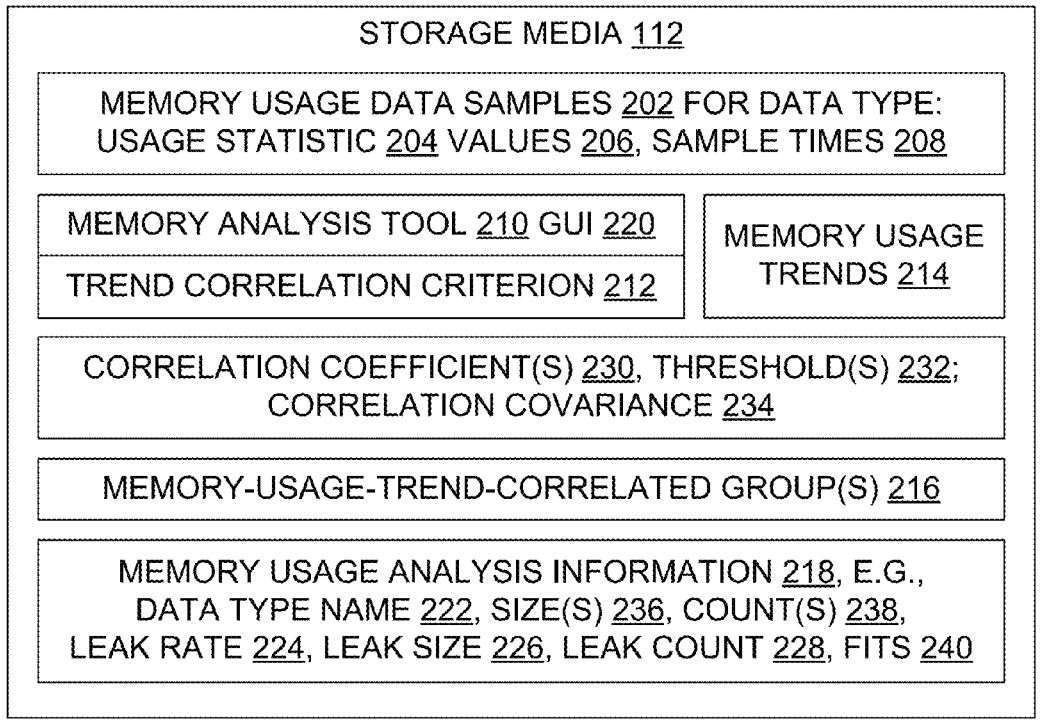
FIG. 2 is a block diagram illustrating aspects of tools and techniques to improve computer system functionality through memory leak analysis by usage trends correlation, in an example architecture.

FIG. 2 illustrates aspects of an architecture which is suitable for use with some embodiments. Memory usage data 132 includes samples 202 showing memory 112 usage statistics 204 for a particular data type 124 such as a class or other user-defined data type, e.g., showing memory which is allocated when creating an instance of that data type. A value 206 of a usage statistic 204 may be a count of the number of items (e.g., instances), or the value 206 may track the amount of memory space used, e.g., in bytes or words or pages or sectors. The values 206 have corresponding sample times 208 indicating when the values were obtained. Samples are thus discrete from one another. However, samples may be taken so closely together, relative to the rate of change in the sampled variable, as to be effectively continuous.

A memory analysis tool 210 can process the memory usage data 132 using one or more trend correlation criteria 212 to produce memory usage trends for individual data types 124 or groups of data types, and identify correlated groups 216 of data types by identifying correlated data type memory usage trends 214. The groupings and other memory usage analysis information 218 may then be utilized, e.g., as a basis for restarting a process. The information 218 may be displayed to a user, such as a software developer. The information 218 is generally displayed in a GUI 220 on a screen or other display 134, but some or all of the information 218 may also be "displayed" by writing it to a file or printing a hard copy or transmitting it across a network 108 to be displayed at a destination. The memory usage analysis information 218 may include data type names 222, leak rates 224, leak sizes 226 indicating memory space lost, and/or leak counts 228 indicating the number of data items in lost memory space, for example. The trend correlation criteria 212 may include correlation coefficients 230, correlation coefficient thresholds 232, and/or correlation covariance(s) 234, for example. For example, in some embodiments the criterion includes a technique used to measure correlation and the selection criteria for the match (which could be a threshold), e.g., {Pearson's coefficient, >0.6}.

With reference to FIGS. 1 and 2, some embodiments provide a computer system 102 with a logical processor 110 and a memory medium 112 configured by circuitry, firmware, and/or software to provide technical effects such as correlation findings about data type-specific memory usage trends which are directed at technical problems such as detections and removal of memory leaks, by extending functionality with a tool 210 and other innovations as described herein. Correlation findings indicate whether trends are correlated under the stated criterion 212, and may also indicate the degree of correlation, e.g., the correlation coefficient calculated for the trends.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such that no human user 104 interacts directly with the embodiment. Software processes may be users 104.

In some embodiments, a memory analysis computer system 102 is configured with a memory analysis aid 210 for improving the functioning of the memory analysis computer system itself or the functioning of another computer system. Improvements in function are provided, e.g., by assisting detection of memory leaks in software 120 which has a processing load 128 and which uses memory 112. The memory analysis computer system includes a logical processor 110 and a memory 112 in operable communication with the logical processor. A trend correlation criterion 212 resides in the memory 112, either as an explicit value or implicitly in instructions 116. The criterion 212 may be a single threshold 232, for example, or a Boolean combination of thresholds and related requirements, e.g., criterion 212 could require "a Pearson product-moment correlation coefficient greater than 0.5 or a Spearman's rank correlation coefficient greater than 0.5". Here, as elsewhere herein, "or" is non-exclusive unless stated otherwise, that is, "or" means "and/or".

A memory analysis tool 210 residing in the memory 112 has instructions 116 which are executable by the processor(s) 110 to identify respective memory usage trends 214 over time for a plurality of data types 124. The tool 210 also has instructions 116 executable to search for correlations between data type memory usage trends 214, and to group data types into memory-usage-trend-correlated groups 216. Grouping the trends 214 corresponds to grouping the data types 124 which the trends represent. All data types in a given memory-usage-trend-correlated group have memory usage trends that satisfy the trend correlation criterion and data types whose trends do not satisfy the trend correlation criterion are not in the given memory-usage-trend-correlated group.

In some embodiments, the trend correlation criterion 212 includes a correlation threshold 232 which has an absolute value of at least 0.45 on a correlation coefficient scale ranging from −1 to +1. This inclusion may be accomplished as a hard-coded constant, as a configurable default or overridden default, and/or as conditional execution instructions 116, for example. Other threshold 232 values may also be used, e.g., 0.4, 0.5, 0.55, or any value is a range, e.g., thresholds may be in the range from 0.4 to 0.6. Thresholds 232 may vary, depending for example on the application 120 and the memory usage patterns. In general, setting a high threshold increases confidence in finding truly related types, but too high a threshold will be too restrictive in what is selected. Setting a low threshold will include more types in the analysis but the results might be noisy. In some embodiments, threshold values and/or correlation methods (Pearson, Spearman, etc.) are interactively user configurable.

In some embodiments, the memory analysis computer tool 210 searches for correlations between data type memory usage trends 214 at least in part by computing one or more particular kinds of correlation coefficients 230 or correlation covariances 234 for data type memory usage trends. Some examples include a Pearson product-moment correlation coefficient, a Spearman's rank correlation coefficient, a Kendall rank correlation coefficient, any statistically significant correlation coefficient, or a distance correlation for the data type memory usage trends 214.

Some embodiments merely perform the trend identification and correlation functions and then store the results, or transmit the results, for later use. Some treat results that show memory loss beyond a specified threshold as trigger condition to restart the lossy process 120. However, some other embodiments of the memory analysis computer system 102 include a display 134, and the memory analysis tool 210 includes software which displays information 218 such as data type names 222 of data types which are in a group 216 identified in the displayed information as having the most memory leakage and/or data type names 222 of user-defined data types 124 which are in a group 216 identified as having the most memory leakage of the user-defined data types. Memory usage analysis information 218 may also or alternatively include an estimated leak size 226 for a particular data type 124, an estimated leak rate 224 in memory size per unit of time for a particular data type 124, an estimated leaked item count 228 for leaked items 126 of a particular data type, and/or an estimated leak rate 224 in item count per unit of time for a particular data type. In some embodiments, the memory analysis tool graphical user interface 220 displays graphs 322 of data type memory usage trends. Graph scales may be linear or logarithmic, for example, and may plot memory size and/or data item counts over time. Scatterplots, bar graphs, and other familiar graph formats may be used to display the data obtained and processed by the innovative tool 210.

In some embodiments, the system includes multiple computers connected by a network. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches, or an embodiment in a computer system may operate without communicating with other computer systems.

Some embodiments operate in a "cloud" computing environment and/or a "cloud" storage environment in which computing services are not owned but are provided on demand. For example, a program 120 whose memory usage will be analyzed may run on one or more devices/systems 102 in a networked cloud, the memory usage data 132 of the program may be stored and/or processed on yet other devices within the cloud, and the memory analysis tool 210 output may configure a display 134 on yet other cloud device(s)/system(s) 102.

Processes

Figures 3, 12:
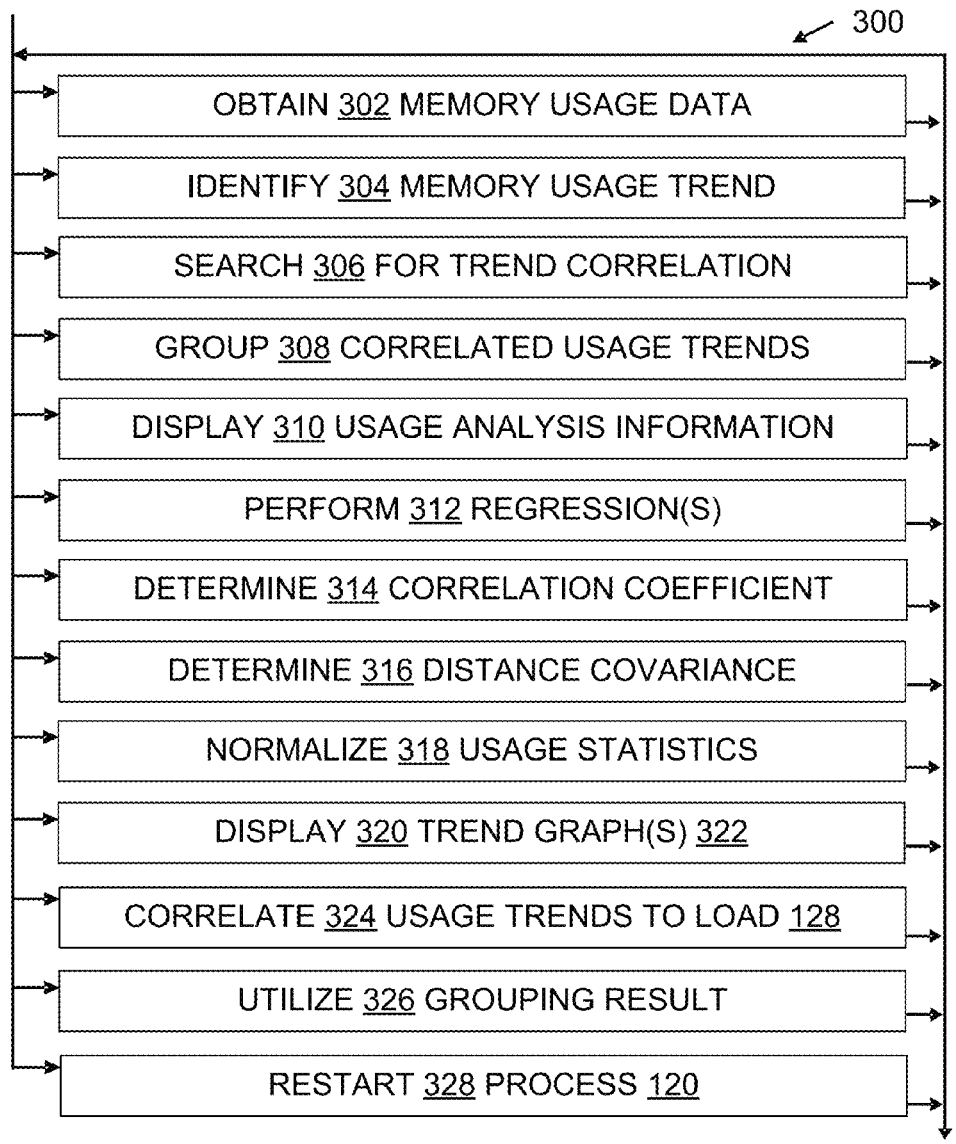
FIG. 3 is a flow chart illustrating steps of some process and configured storage medium embodiments.
FIG. 12 is a table illustrating content of a type histogram.

FIG. 3 illustrates some process embodiments in a flowchart 300. Technical processes shown in the Figures or otherwise disclosed may be performed in some embodiments automatically, e.g., by memory analysis tool 210 under control of a script or otherwise requiring little or no contemporaneous live user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different technical features, mechanisms, and/or data structures, for instance, and may otherwise depart from the examples provided herein.

Some embodiments provide a process for improving the functioning of a computer (laptop, smartphone, tablet, workstation, server box, embedded system, etc.) by assisting detection of memory leaks in a software program which has a processing load and which uses memory. In some embodiments, the process includes obtaining 302 memory usage data 132. This can be accomplished using familiar techniques such as code instrumentation, memory dump analysis, memory allocator instrumentation, memory allocator monitoring, and/or garbage collection monitoring, adapted to provide data samples 202 for one or more particular data types 124 of interest. The memory usage samples 202 collectively specify a plurality of data types 124, with each individual memory usage sample specifying a value 206 of at least one usage statistic 204 for at least one of the data types at a specified sample time 208. Some examples of usage statistics are memory size (in bytes, words, pages, sectors, or another familiar unit), and item counts (where items are objects, records, structs, nodes, or other items for which the program 120 allocates a piece of memory as a unit).

In some embodiments, the process includes computationally identifying 304 respective memory usage trends over time for a plurality of the data types. This is accomplished computationally, e.g., by processing at least part of the memory usage data with a processor; those of skill will recognize that trying to identify these trends mentally or by hand would be a foolish and futile endeavor. In particular, trend identification can be accomplished (partially or entirely) by computationally interpolating between samples 202 to obtain a section of a piecewise linear function or another function representing the trend. Trend identification 304 can be accomplished (partially or entirely) by computationally fitting memory usage data to a linear or piecewise linear or nonlinear curve. Fitting may use linear or nonlinear regressions, for example, with least squares or another metric. Least squares itself also includes various options, e.g., ordinary least squares, generalized least squares, percentage least squares, and so on. In addition, note that outlier samples may be excluded when they are not statistically significant.

In some embodiments, the process includes computationally searching 306 for correlations between data type memory usage trends. A search 306 may be accomplished by computing covariances, correlations, or other statistical measures of the distances between pairs or other tuples of trends 214, and then comparing results with a predetermined threshold 232 and/or with some or all of the other computed statistical measures. For example, any pair or other tuple of trends having a computed correlation coefficient greater than a user-specified threshold of 0.6 are considered correlated in some embodiments. As another example, any tuple of trends 214 having a computed correlation coefficient whose absolute value is greater than a default but configurable threshold of 0.4 are considered correlated in some embodiments. As another example, whichever collection of up to N trends 214 has the largest correlation coefficient computed for a given collection of all trends 214 identified with given memory usage data 132—whatever that coefficient's value might be—are considered correlated in some embodiments. In this context, "predetermined" means specified prior to comparing the computed statistical measures. Different statistical measures and/or different threshold values define different trend correlation criteria 212.

Some embodiments computationally group 308 data types 124 into memory-usage-trend-correlated groups 216 based on the computed statistical measures. Thus, all data types in a given memory-usage-trend-correlated group have memory usage trends that satisfy a predetermined trend correlation criterion 212, and data types whose trends do not satisfy the predetermined trend correlation criterion are not in the given memory-usage-trend-correlated group. Groups 216 may be represented in memory 112 as a list or array of pointers, indexes, handles, or other trend 214 identifiers, for example.

Some embodiments utilize 326 the grouping 308 results as a basis for further action. For instance, some restart 328 a process 120 that has lost too much memory, or one that is on trend to lose too much memory, based on the grouping 308 results. Some embodiments display 310 memory usage analysis information 218 about data type groupings. An act of display 310 may configure a display device 134 such as a screen or monitor, but "displaying" also encompasses writing to a log file, transmitting to a printer, or transmitting across a network connection toward another device 102. Some embodiments display 310 data type names 222 of data types 124 which are in a group 216 that is identified to a user 104 as having the most memory leakage. In particular, some display 310 data type names 222 of data types 124 which are in a group 216 that is identified to a user 104 as having the most memory leakage of the various user-defined data types 124. Some embodiments display 310 an estimated leak size 226 for a particular data type, namely, the estimated amount of memory leaked as items 126 of that data type. Some embodiments display 310 an estimated leak rate 224 in memory size per unit of time for a particular data type 124. Some display 310 an estimated leaked item count 228 for a particular data type 124. Some display 310 an estimated leak rate 224 in item 126 count per unit of time for a particular data type. Some display 310 a combination of the foregoing examples.

In some embodiments, the predetermined trend correlation criterion 212 specifies that trends 214 are correlated when, and only when, they have a correlation coefficient 230 beyond a predetermined correlation threshold 232. In other embodiments, a trend correlation criterion 212 specifies that trends 214 are correlated when they have a correlation covariance 234 beyond a predetermined threshold 232. In some embodiments, a trend correlation criterion 212 specifies a Boolean combination of threshold satisfaction conditions, e.g., having both a Pearson product-moment correlation coefficient greater than X and a Spearman's rank correlation coefficient greater than Y, where 0<X, Y<1. In some embodiments, usage statistics 204 for data types 124 include at least one of the following: a count 238 indicating how many items 126 of the data type were allocated; a count 238 indicating how many items 126 of the data type were deallocated; a memory size 236 indicating how much memory 112 was designated as allocated to items 126 of the data type; a memory size 236 indicating how much memory 112 designated as allocated to items 126 of the data type was deallocated. Memory 112 is designated as allocated or deallocated by a memory manager, garbage collector, heap management data structure, tool instrumentation, and/or other familiar mechanism, for example.

In some embodiments, computationally identifying 304 respective memory usage trends 214 includes at least one of the following: performing 312 simple linear regression using least squares to fit usage statistics 204 to a linear trend 214, performing 312 a segmented regression to fit usage statistics 204 to a piecewise linear trend 214, or performing 312 a nonlinear regression to fit usage statistics 204 to a nonlinear trend 214, for example. To help accomplish these computations, familiar statistical computing libraries can be used in a program workflow designed according to the teachings herein, for example. In some embodiments, computationally identifying respective memory usage trends includes normalizing 318 usage statistics 214 for the processing load of the program 120 to which the usage statistics pertain.

In some embodiments, computationally searching for correlations between data type memory usage trends includes at least one of the following: determining 314 a Pearson product-moment correlation coefficient for data type memory usage trends 214, determining 314 a Spearman's rank correlation coefficient for data type memory usage trends 214, determining 314 a Kendall rank correlation coefficient for data type memory usage trends 214, determining 314 a distance correlation for data type memory usage trends 214, determining 316 a distance covariance for data type memory usage trends 214, or determining 316 a Brownian distance covariance for data type memory usage trends 214.

Figure 9:
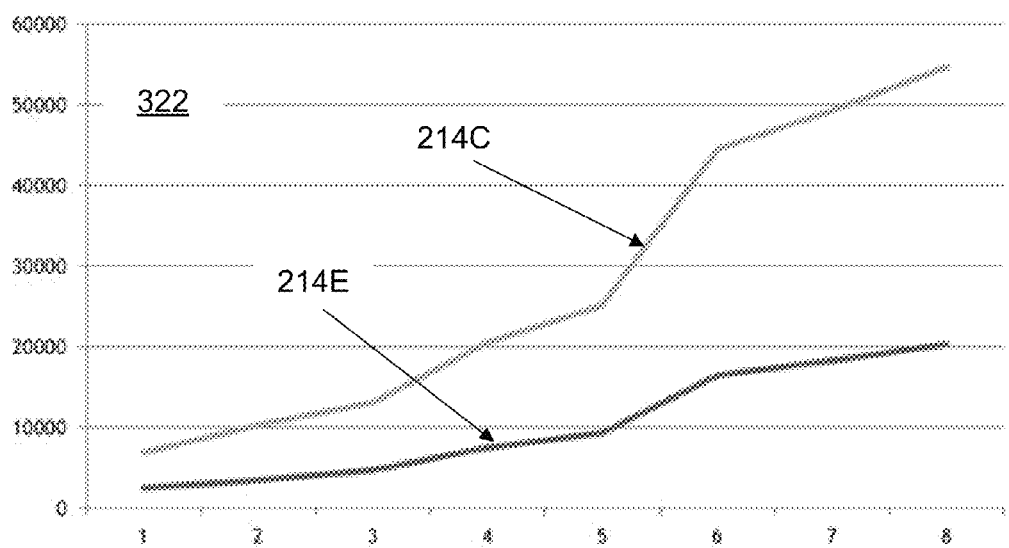
FIG. 9 is a graph illustrating two memory usage trends which are correlated, even though their respective rates of growth are different.

In some embodiments, two (or more) data types may be grouped into a memory-usage-trend-correlated group 216 when their respective trends 214 have a correlation coefficient above a predetermined threshold, even though the trends have different growth rates. FIG. 9 illustrates one example displaying 320 trend graphs 322 for two such trends 214.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (as opposed to mere propagated signals). The storage medium which is configured may be in particular a removable storage medium 114 such as a CD, DVD, or flash memory. A general-purpose memory, which may be removable or not, and may be volatile or not, can be configured into an embodiment using items such as memory usage trends 214, trend correlation criteria 212, a memory analysis tool 210 which operates as describe herein, and trend groups (which are effectively also data type groups) 216, in the form of data 118 and instructions 116, read from a removable medium 114 and/or another source such as a network connection, to form a configured medium. The configured medium 112 is capable of causing a computer system to perform technical process steps for detecting and pinpointing memory leaks by particular data types or data type groups, as disclosed herein. FIGS. 1 through 3 thus help illustrate configured storage media embodiments and process embodiments, as well as system and process embodiments. In particular, any of the process steps illustrated in FIG. 3 and/or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific APIs and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein. Aspects of some existing, planned, or potential versions the Microsoft Visual Studio® program and/or documentation are consistent with or otherwise illustrate aspects of some of the embodiments described herein (mark of Microsoft Corporation). However, it will be understood that Visual Studio® documentation and/or implementation choices do not necessarily constrain the scope of such embodiments, and likewise that Visual Studio® and other Microsoft® products and/or their documentation may well contain features that lie outside the scope of such embodiments (marks of Microsoft Corporation). It will also be understood that the discussion below is provided in part as an aid to readers who are not necessarily of ordinary skill in the art, and thus may contain and/or omit details whose recitation below is not strictly required to support the present disclosure.

Figure 4:
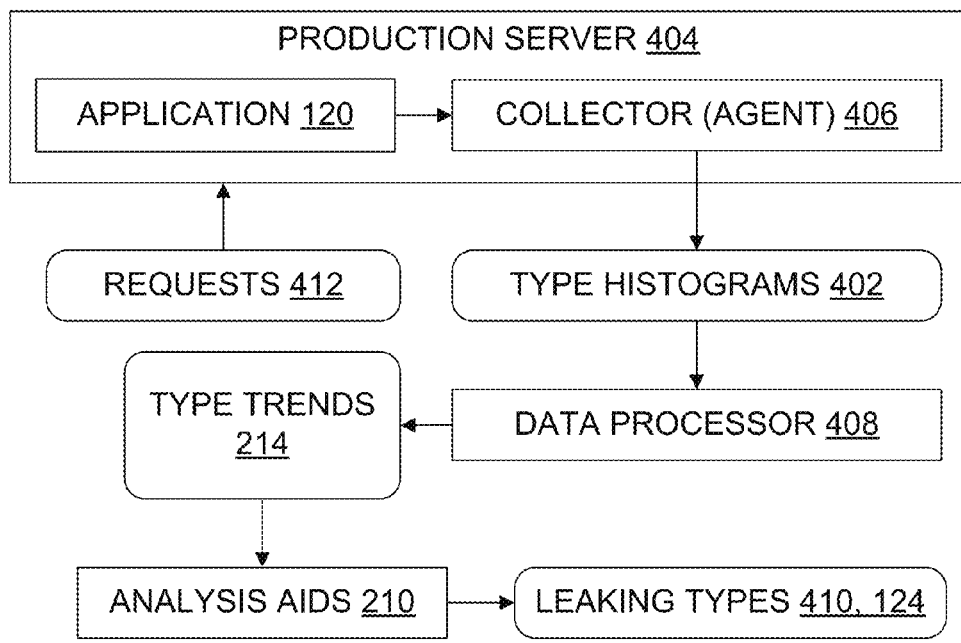
FIG. 4 is a data flow diagram illustrating aspects of memory leak analysis by usage trends correlation in an example architecture.

In some examples, an approach to memory leak detection is based on lightweight sampling of memory heaps 130 used by an application 120 and on the statistical analysis of the resulting memory usage data 132. As illustrated in FIG. 4, lightweight samples 202 of the heap (called type histograms 402) are collected periodically on a production machine 404 by a sampling agent 406. The samples are collated by a data processor module 408 to get memory trend information 214 for the application process 120 and its individual types 124. These trends 214 are analyzed statistically by memory analysis aids 210 to ascertain whether the process 120 is leaking memory, and if so, to identify which of the individual types 124 are leaking types 410. The aids 210 may also calculate leak metrics 218 such as leak rates 224 in terms of memory size 236 and data item counts 238 both for the process 120 overall and for individual types 124 or type groups 216. Such an approach helps provide developers 104 with information about the context of the memory leaks by statistically determining which other types in the process 120 have similar memory profiles (to get related types). In some cases, this approach can also provide additional context by correlating 324 data type memory usage trends to processing load 128 request trends to find which requests are related to the leak. Such information 218 is presented 310 to the user 104 in a concise, visual report that helps the user formulate a course of action to reduce or eliminate the memory leakage problem(s).

This approach can be thought of as having three parts. One part is collection of lightweight type histogram data. A second part is statistical analysis of the data to get leaking types and other information useful to set context. The third part is presenting relevant results to the user(s). Each part is discussed further below.

Data Collection

In the data collection stage, one collects lightweight samples 202 of the memory heap 130 at regular intervals and does some processing to get type trends 214. In this example, the lightweight samples are called "type histograms" because they contain basic statistics of each type 124 such as item size and item counts. This forms a basis of an analysis. One example of type histogram content is shown in FIG. 12. Over time, many such type histograms 402 are collected and stored. Each histogram has information about the state of the heap 130 at the collection time 208. Note that this leak analysis approach is not dependent on the specific collection technology; any mechanism providing the raw usage data 132 can be used to gather it as input to the analysis.

Figure 5:
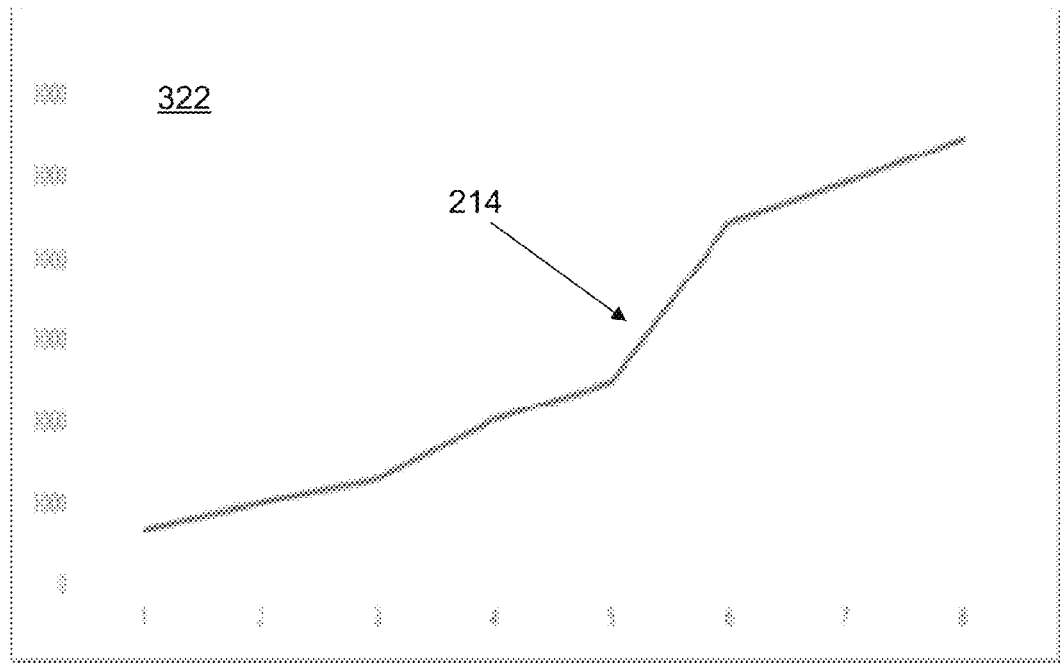
FIG. 5 is a graph illustrating an example memory usage trend of a data type (also referred to, e.g., as a "type trend" or a "usage trend")

This histogram data is processed to get type trends, e.g., information about how a specific type's size/count trends over the sampled time period. For example, System.String in the FIG. 12 table could have a trend over the sampled period like the one shown in FIG. 5. After data collection, one has type trends for some or all types 124 which have instances (items 126) on the heap (or other memory 112 of interest).

Note that in FIGS. 5-9, the specific numeric values shown as markers along the axes are not important to the teachings presented here. The relative shapes of the graphed lines and other functions shown in these Figures could be much the same for present purposes, even if different numeric markers were used. Indeed, FIGS. 10 and 11 include stylized graphs which use short line segments as axis markers instead of using numbers.

Some technical benefits of working with trends 214 for memory leak analysis will be apparent to those of skill in the art. The trend information is relatively easy to compute once its value is understood, and it is also relatively lightweight to collect with minimal impact on the underlying application 120 being monitored. One pays a relatively low cost for serializing this trend data to disk or sending it over the network 108. Because sample times 208 and process 120 information 124, 128 can be captured, it may be easier to join this data with other data sources in later analysis.

Memory Leak Analysis

In this part of the approach outlined above, tools 210 analyze the type trend information to find out which types 124 are leaking and to find related types that provide developers with additional context to aid debugging.

Figure 6:
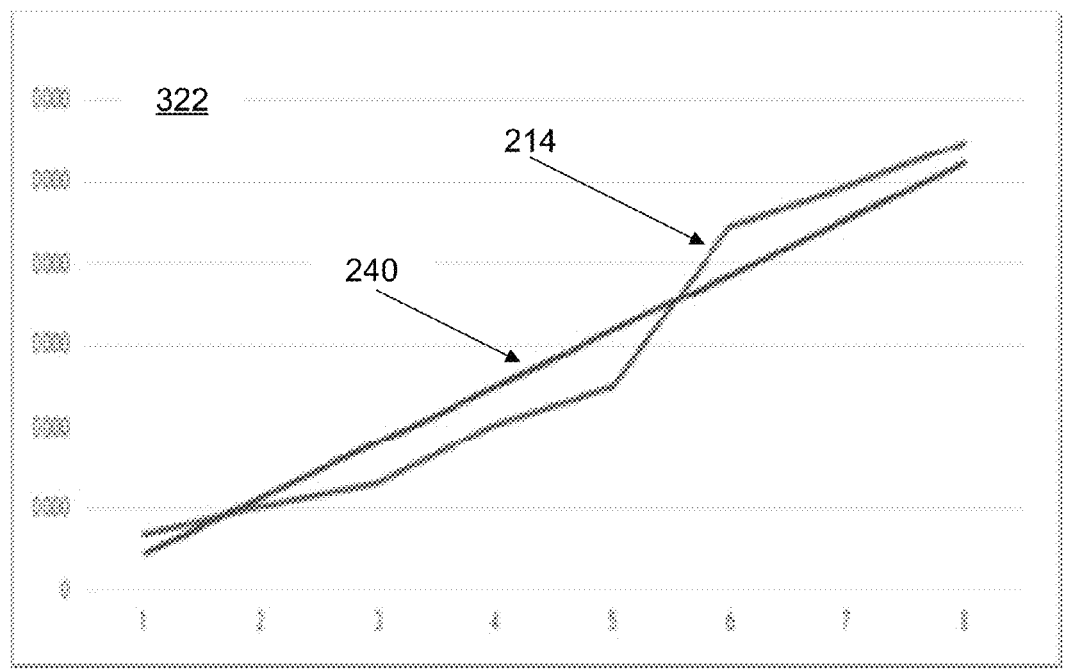
FIG. 6 is a graph illustrating a use of linear regression to fit the FIG. 5 memory usage trend to a linear function to facilitate a search for correlations between data type memory usage trends and/or to provide memory usage analysis information such as an estimated leak rate and estimated leak size.

As to finding leaking types, some tools 210 take the type trend information, use linear regression to identify the function that fits the observed samples, and determine how the function changes over time (growth indicates leakage). As an example below, FIG. 6 illustrates a simple linear regression using a least squares calculation to fit the FIG. 5 observed trend 214 of System.String to get a line function as a fit 240. Fitted functions 240 may serve as trends 214. When the load and request types are approximately constant in the sampled interval, a positive slope of the estimated line above a threshold (e.g., slope over 0.18 or 10 degrees) can indicate the existence of a leak. It is possible for non-leaking trends to be slightly positive within a sample interval. But in many cases, a slope on the usage trend which is greater than the slope on the load and request trends indicates a memory leak possibility that is worth investigating further. Tools 210 can also calculate some inferred metrics about the leak. The slope of the fit 240 is an estimated leak rate 224, which is in bytes per minute or per sample, for instance, depending on the unit on the horizontal axis. The product of leak rate times sampled period gives an estimated size 226 of the leak. The fit line's Y-intercept gives an estimated start state for the memory usage.

Performing such an analysis for all types in the histogram provides leak rates 224 for each of those types 124. The leak rates can be sorted to identify the most leaking types, and provide developers with a basis for prioritizing which types to start investigating in detail. Types with near zero leak rates and/or negative leak rates can be filtered out from investigations. This approach can significantly narrow down the set of interesting types 124, which can make the investigating developer's job much easier.

One of skill will acknowledge that least squares is only one kind of linear regression that can be applied. Others regressions can be applied for different types of trends, e.g., non-linear trends 214. A combination of linear regression models can be evaluated to find a good or optimal fit 240 for the type under analysis. Also, such an analysis can be done with either counts or sizes. Depending on the type under analysis, one or both can be interesting. Some variations account for load 128. An embodiment can account for load by normalizing 318 for requests per second (e.g., divide sample value by requests per second at that period) and/or by overlaying load information on the UI chart 322 so users 104 can see the load and decide whether the apparent leak is actual or not (e.g., a proportional usage size increase in step with a higher load may be expected and ruled out as a leak).

Related Types

In practice, many of the top leaking types in a given situation are often system types that a user's custom types use and reference. Knowing for example that System.String is the top leaking type might not help a developer determine knowing where a leak is located. One way to provide more context about a leak is to identify other related types that are leaking along with the top leaking type 124. This grouping 216 might show user types 124 that wouldn't other bubble up to the top of the leaking type list because they do not leak at the same rate or size per instance as the top leaking types.

Figure 7:
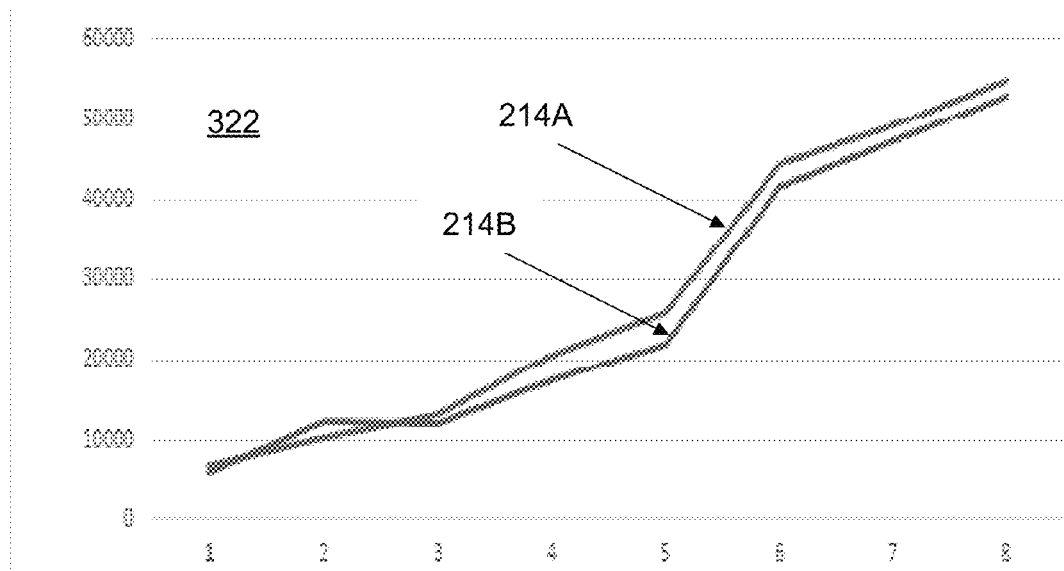
FIG. 7 is a graph illustrating two memory usage trends which are correlated (also referred to, e.g., as "closely related trends" or "related trends")
Figure 8:
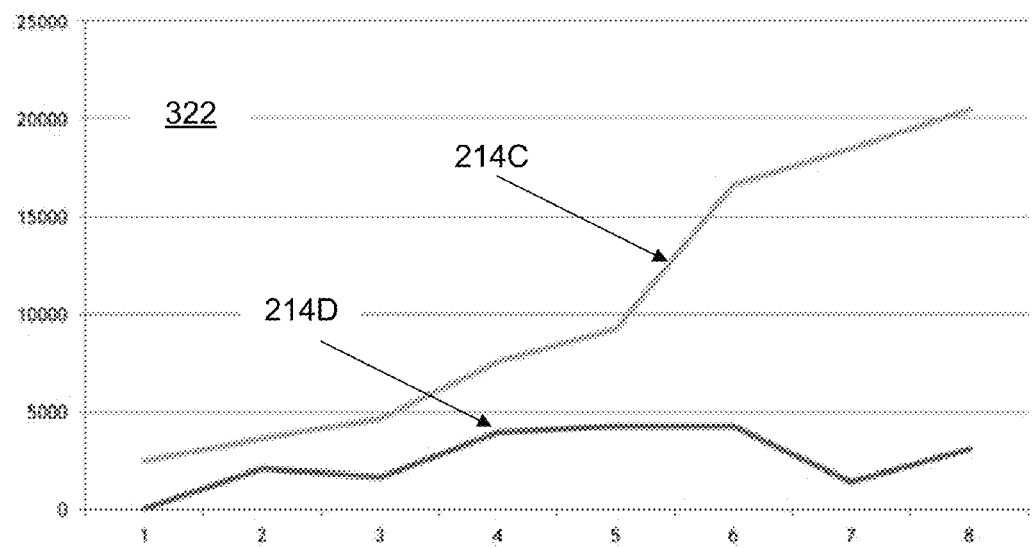
FIG. 8 is a graph illustrating two memory usage trends which are not correlated (also referred to, e.g., as "unrelated trends")

To accomplish this, some embodiments compare type trends and look for correlation between them. One way to do this is to use a Pearson product-moment correlation coefficient or a Spearman's rank coefficient, for example, to find out how closely two trends match and use the degree of correlation (or lack thereof) as a basis for finding related types 124. A high (in absolute value) correlation coefficient 230 indicates high relation while a low (in absolute value) coefficient indicates low or no relationship. That is, in the coefficient range from +1 to −1, values close to zero represent low or no relationship, while values closer to +1 or −1 represent high relationship (−1 is fully negatively correlated). FIG. 7 illustrates one example of types that are closely related, as confirmed by the visual similarity in their trends 214A and 214B. One of these trends is a top leaking type, and the second one being evaluated to see whether and how it is related. By contrast, FIG. 8 illustrates an example of two trends 214C and 214D that are not related. As yet another example, FIG. 9 illustrates trends 214C and 214E for two data types 124 that are related types, even though their rates of growth are different.

Some examples according to teachings herein use such an analysis to include related type information for types that are (cor)related to the top leaking types. Thus, when a user 104 looks at the top leaking type, say System.String, they can also see the other related types leaking in a similar way, say a custom user-defined type like an Employee type. This correlation can be used by the developer to piece together places where the leak might be originating in code 122.

One variation clusters together related types and shows top leaking clusters (a.k.a. groups 216), instead of individual types. This allows developers to look at an entire leak group instead of individual types, which can provide more useful context.

Related Requests

For web applications 120, it is also sometimes interesting to know which request or requests a leak is more closely associated with. Load 128 requests 412 may be HTTP requests, HTTPS requests, or other web application or web server requests, for example. This not only gives investigating developers more context, it also gives them a good starting point to understand the user scenario impacted by any changes.

One variation collects information about requests processed while type histograms are collected. The information about each request 412 is transformed by data processor 408 into a cumulative sum series, which is a sequence of partial sums of the given request sequence. Thus, if {x, y, z} was the original request 412 sequence, the cumulative sum series is {x, x+y, x+y+z}. The cumulative sum series is an increasing series. An analysis aids 210 then performs similar correlation analyses (as described above for trends 214) to find out which of the requests 412 matches the leak trend most closely. A high correlation here would indicate that the leak is associated with the request under question. Moderately high correlation between a leak trend and a number of requests would indicate that the leak is in a shared component, which is also useful debugging information.

Result Presentation

Figure 10:
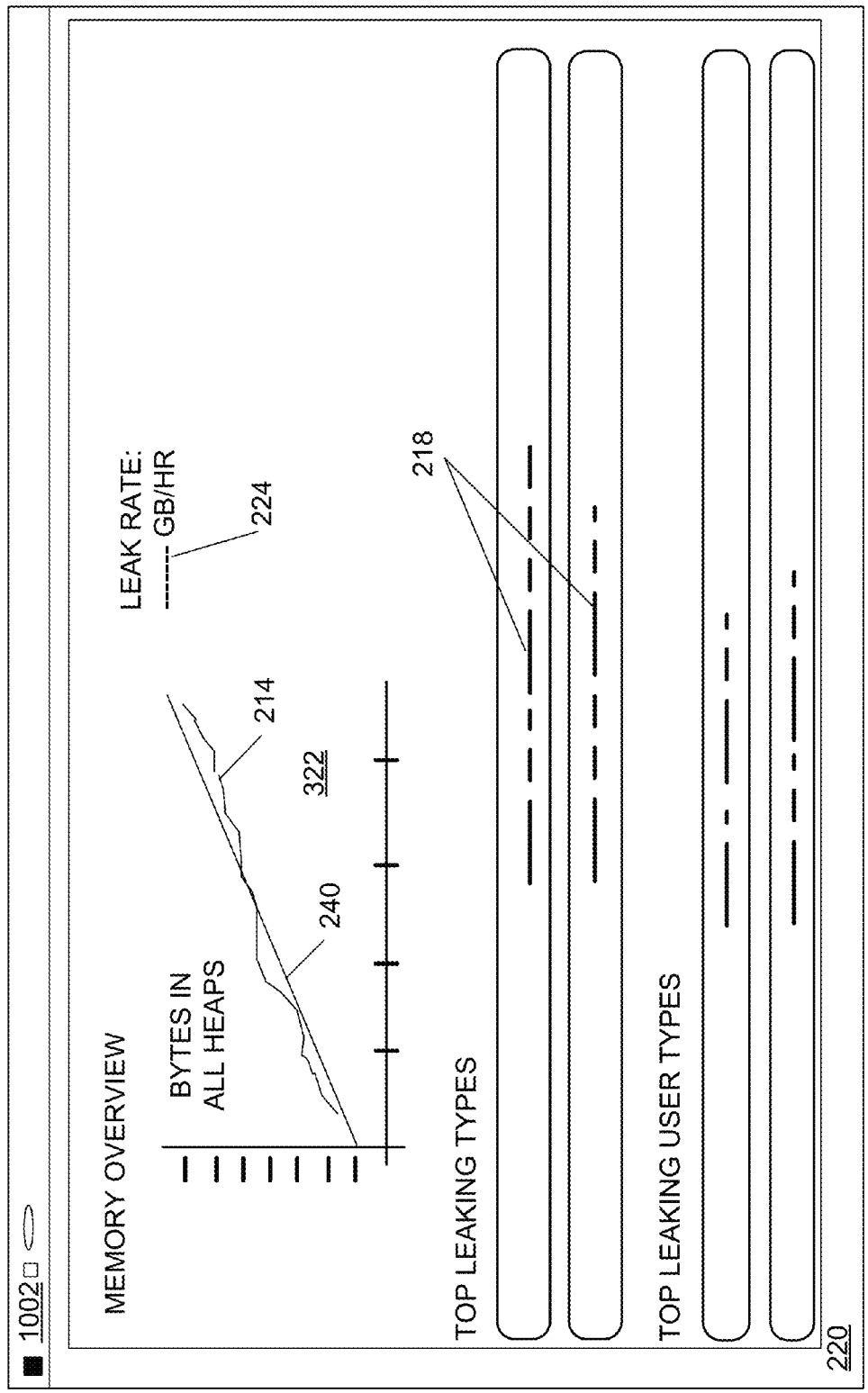
FIG. 10 is screen depiction illustrating some of the many possible graphical user interfaces (GUIs) that could be used to present memory usage analysis information about data types.

Some embodiments present the analysis results as information 218 in a concise prioritized form that allows users 104 to act upon the most impactful leaks first. This display can be in the form of a web report or a report in a rich client such as an IDE 136. FIG. 10 illustrates one example of a user interface 220, with a menu bar 1002, a graph 322 for memory usage overall, and easy user access to a list of the top leaking types overall (including both user types 124 and system types 124) and a list of the top leaking user-defined types. In this stylized representation of an actual display, text and numbers are represented by dashes. For example, the leak rate in an actual embodiment would be an actual value, e.g., 83.64 gigabytes per hour, and the top leaking types would have names 222, e.g., System.Byte[ ], Free, System.String, or whatever occurs in the situation in question (embodiments are not limited to types 124 provided by Microsoft® system software or Microsoft® libraries). The amount 226 of each data type's leakage could be shown next to the data type's name. A whitelist of type names and/or list of system libraries/assemblies/object modules can be used to distinguish between system types and user-defined types.

Figure 11:
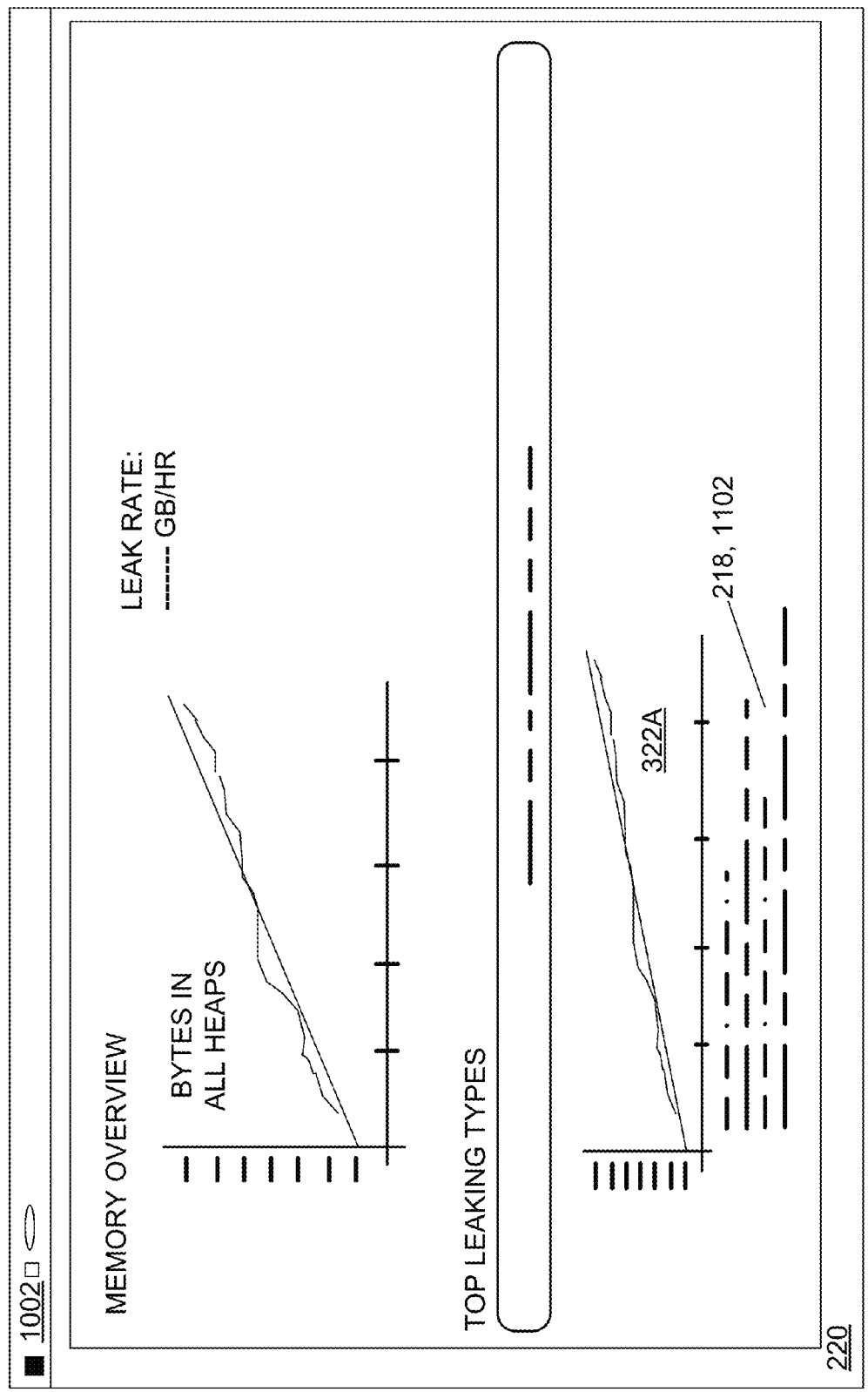
FIG. 11 is a different screen depiction of the FIG. 10 GUI, showing expanded detail for one of the data types.

FIG. 11 illustrates the FIG. 10 interface with the top leaking type's information 218 shown in an expanded format 1102. In some embodiments, the expanded format 1102 includes or identifies one or more of the following: related user types, related system types. Some versions show correlation coefficients for each related type along with that type's name, estimated leak size, and estimated leak instance count. In some versions, the expanded information's graph 322A is accompanied by text stating the data type's estimated leak size, estimated leaked instance count, leak rate in gigabytes per hour, and leak rate in instances per hour. Other versions include graphic presentations of information 218 in the form of histograms, scatterplots (e.g., with a horizontal axis marked as a log scale of the average size of objects 126 and a vertical axis marked as a log scale of a rate of increase in size), pie charts, and other presentation formats. Some versions point users to the most useful information first, in the form of the largest leaks and/or the most correlated trends.

Additional Technical Results

Persons of skill in the art will recognize that approaches described herein may involve only lightweight data collection, serialization, and transfer, so that in comparison with full memory dumps, the impact on a computing environment's performance is small or even nominal. Sampling over an extended period of time may also have the result of correcting errors and giving more accurate results, as opposed to memory dumps which tend to be discrete and hence sensitive to the state of the heap when it was taken. Helpful metrics like leak rates in megabytes per minute and instances (data items) per minute, among others, are available in many cases. Approaches described herein help developers prioritize which types 124 to investigate first for memory leaks. Approaches herein may also be joined with other data sources, like incoming requests or garbage collections, for additional diagnostic results. Results of some approaches described herein provide context for memory leaks from a data type, such as related leaking types, clustering (grouping) of leaking types, and related requests.

Additional Statement of Some Examples

A computational process for improving the functioning of a computer by assisting detection of memory leaks in a software program which has a processing load and which uses memory includes various steps, in various combinations with one or more of each other.

A step that may be present is obtaining memory usage data which includes memory usage samples which collectively specify a plurality of data types. In some cases, each memory usage sample specifies a value of at least one usage statistic for at least one of the data types at a specified sample time.

A step that may be present is computationally identifying respective memory usage trends over time for a plurality of the data types, by processing at least part of the memory usage data with a processor.

A step that may be present is computationally searching for correlations between data type memory usage trends.

A step that may be present is computationally grouping data types into memory-usage-trend-correlated groups. In some cases, all data types in a given memory-usage-trend-correlated group have memory usage trends that satisfy a predetermined trend correlation criterion. In some cases, data types whose trends do not satisfy the predetermined trend correlation criterion are not in the given memory-usage-trend-correlated group.

A step that may be present is displaying memory usage analysis information about data types that were grouped by the grouping step.

In some cases, a predetermined trend correlation criterion specifies that trends are correlated when, and only when, they have a correlation coefficient beyond a predetermined correlation threshold.

In some cases, usage statistics for a data type include a count indicating how many items of the data type were allocated.

In some cases, usage statistics for a data type include a count indicating how many items of the data type were deallocated.

In some cases, usage statistics for a data type include a memory size indicating how much memory was designated as allocated to items of the data type.

In some cases, usage statistics for a data type include a memory size indicating how much memory designated as allocated to items of the data type was deallocated.

In some cases, identifying respective memory usage trends includes performing simple linear regression using least squares to fit usage statistics to a linear trend.

In some cases, identifying respective memory usage trends includes performing a segmented regression to fit usage statistics to a piecewise linear trend.

In some cases, identifying respective memory usage trends includes performing a nonlinear regression to fit usage statistics to a nonlinear trend.

In some cases, computationally searching for correlations between data type memory usage trends includes determining a Pearson product-moment correlation coefficient for data type memory usage trends.

In some cases, computationally searching for correlations between data type memory usage trends includes determining a Spearman's rank correlation coefficient for data type memory usage trends.

In some cases, computationally searching for correlations between data type memory usage trends includes determining a Kendall rank correlation coefficient for data type memory usage trends.

In some cases, computationally searching for correlations between data type memory usage trends includes determining a distance correlation for data type memory usage trends.

In some cases, computationally searching for correlations between data type memory usage trends includes determining a distance covariance for data type memory usage trends.

In some cases, computationally searching for correlations between data type memory usage trends includes determining a Brownian distance covariance for data type memory usage trends. Brownian distance covariance is only one example of a distance covariance.

In some cases, computationally identifying respective memory usage trends includes normalizing usage statistics for the processing load.

In some cases, computationally grouping data types into memory-usage-trend-correlated groups includes grouping two data types which have trends that have a correlation coefficient above a predetermined threshold even though the trends have different growth rates.

In some cases, displaying memory usage analysis information about data types that were grouped by the grouping step includes displaying data type names of data types which are in a group identified to a user as having the most memory leakage.

In some cases, displaying memory usage analysis information about data types that were grouped by the grouping step includes displaying data type names of user-defined data types which are in a group identified as having the most memory leakage of the user-defined data types.

In some cases, displaying memory usage analysis information about data types that were grouped by the grouping step includes displaying an estimated leak size for a particular data type.

In some cases, displaying memory usage analysis information about data types that were grouped by the grouping step includes displaying an estimated leak rate in memory size per unit of time for a particular data type.

In some cases, displaying memory usage analysis information about data types that were grouped by the grouping step includes displaying an estimated leaked item count for a particular data type.

In some cases, displaying memory usage analysis information about data types that were grouped by the grouping step includes displaying an estimated leak rate in item count per unit of time for a particular data type.

Some examples provide a computer-readable storage medium configured with data and with instructions that when executed by at least one processor causes the processor(s) to perform a technical process for assisting detection of memory leaks in software which has a processing load and which uses memory.

A step that may be present is obtaining memory usage data which includes memory usage samples which collectively specify a plurality of data types, each memory usage sample specifying a value of at least one usage statistic for at least one of the data types at a specified sample time.

A step that may be present is computationally identifying respective memory usage trends over time for a plurality of the data types, by processing at least part of the memory usage data with a processor.

A step that may be present is computationally searching for correlations between data type memory usage trends.

A step that may be present is computationally grouping data types into memory-usage-trend-correlated groups, such that all data types in a given memory-usage-trend-correlated group have memory usage trends that satisfy a predetermined trend correlation criterion, the predetermined trend correlation criterion specifying that trends are correlated when they have a correlation coefficient that is beyond a predetermined correlation threshold.

In some cases, a predetermined correlation threshold has an absolute value of at least 0.5 on a correlation coefficient scale ranging from −1 to +1.

In some cases, usage statistics for data types include a count indicating how many items of the data type were allocated.

In some cases, usage statistics for data types include a memory size indicating how much memory was designated as allocated to items of the data type.

In some cases, computationally identifying respective memory usage trends includes performing at least one linear regression.

In some cases, computationally identifying respective memory usage trends includes normalizing usage statistics for the processing load.

In some cases, computationally searching for correlations between data type memory usage trends includes at least one of the following: determining a Pearson product-moment correlation coefficient for data type memory usage trends, determining a Spearman's rank correlation coefficient for data type memory usage trends, determining a Kendall rank correlation coefficient for data type memory usage trends, or determining a distance correlation for data type memory usage trends.

A step that may be present is displaying data type names of data types which are in a group identified to a user as having the most memory leakage.

A step that may be present is displaying data type names of user-defined data types which are in a group identified as having the most memory leakage of the user-defined data types.

A step that may be present is displaying an estimated leak size for a particular data type.

A step that may be present is displaying an estimated leak rate in memory size per unit of time for a particular data type.

A step that may be present is displaying an estimated leaked item count for a particular data type.

A step that may be present is displaying an estimated leak rate in item count per unit of time for a particular data type.

A memory analysis computer system may be configured with a memory analysis aid for improving the functioning of the memory analysis computer system itself or the functioning of another computer system, by assisting detection of memory leaks in software which has a processing load and which uses memory.

The memory analysis computer system typically includes a logical processor, and a memory in operable communication with the logical processor.

A trend correlation criterion may reside in the memory.

A memory analysis tool may reside in the memory and may have instructions executable by the processor to identify respective memory usage trends over time for a plurality of data types, search for correlations between data type memory usage trends, and group data types into memory-usage-trend-correlated groups. In some cases, all data types in a given memory-usage-trend-correlated group have memory usage trends that satisfy the trend correlation criterion and data types whose trends do not satisfy the trend correlation criterion are not in the given memory-usage-trend-correlated group.

The memory analysis computer system may include a display. The memory analysis tool may include software which displays at least two of the following items: data type names of data types which are in a group identified to a user as having the most memory leakage, data type names of user-defined data types which are in a group identified as having the most memory leakage of the user-defined data types, an estimated leak size for a particular data type, an estimated leak rate in memory size per unit of time for a particular data type, an estimated leaked item count for a particular data type, or an estimated leak rate in item count per unit of time for a particular data type. The memory analysis computer system may have a memory analysis tool which displays at least three of the items. The memory analysis computer system may have a memory analysis tool which displays at least four of the items.

A trend correlation criterion may include a correlation threshold which has an absolute value of at least 0.4 on a correlation coefficient scale ranging from −1 to +1. A trend correlation criterion may include a correlation threshold which has an absolute value of at least 0.45 on a correlation coefficient scale ranging from −1 to +1. A trend correlation criterion may include a correlation threshold which has an absolute value of at least 0.5 on a correlation coefficient scale ranging from −1 to +1. A trend correlation criterion may include a correlation threshold which has an absolute value of at least 0.55 on a correlation coefficient scale ranging from −1 to +1. A trend correlation criterion may include a correlation threshold which has an absolute value of at least 0.6 on a correlation coefficient scale ranging from −1 to +1.

The memory analysis tool may search for correlations between data type memory usage trends at least in part by computing at least one (or in another example, at least two) of the following: a Pearson product-moment correlation coefficient for data type memory usage trends, a Spearman's rank correlation coefficient for data type memory usage trends, a Kendall rank correlation coefficient for data type memory usage trends, a statistically significant correlation coefficient for data type memory usage trends, a distance correlation for data type memory usage trends.

In some examples, the memory analysis tool includes a graphical user interface and software which displays graphs of data type memory usage trends.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computational process for improving the functioning of a computer by assisting detection of memory leaks in a software program which has a processing load and which uses memory, the process comprising:
    (a) obtaining memory usage data which includes memory usage samples which collectively specify a plurality of data types, each memory usage sample specifying a value of at least one usage statistic for at least one of the data types at a specified sample time;
    (b) computationally identifying respective memory usage trends over time for a plurality of the data types, by processing at least part of the memory usage data with a processor;
    (c) computationally searching for correlations between data type memory usage trends, wherein the searching comprises computing statistical measures of distances between pairs or other tuples of the data type memory usage trends;
    (d) computationally grouping data types into memory-usage-trend-correlated groups based on the computed statistical measures of distances between pairs or other tuples of the data type memory usage trends, such that all data types in a given memory-usage-trend-correlated group have memory usage trends that satisfy a predetermined trend correlation criterion, and data types whose trends do not satisfy the predetermined trend correlation criterion are not in the given memory-usage-trend-correlated group;
    (e) utilizing a result of the grouping step;
    (f) computationally searching for correlations between data type memory usage trends and one or more processing load request trends; and
    (g) presenting to a user a report which includes information, based on said searching, about a correlation between data type memory usage and processing load requests.

2. The computational process of claim 1, wherein the predetermined trend correlation criterion specifies that trends are correlated when, and only when, they have a correlation coefficient beyond a predetermined correlation threshold.

3. The computational process of claim 1, wherein usage statistics for each of the data types include at least one of the following:
    a count indicating how many items of the data type were allocated;
    a count indicating how many items of the data type were deallocated;
    a memory size indicating how much memory was designated as allocated to items of the data type;
    a memory size indicating how much memory designated as allocated to items of the data type was deallocated.

4. The computational process of claim 1, wherein computationally identifying respective memory usage trends includes at least one of the following:
    performing simple linear regression using least squares to fit usage statistics to a linear trend;
    performing a segmented regression to fit usage statistics to a piecewise linear trend;
    performing a nonlinear regression to fit usage statistics to a nonlinear trend.

5. The computational process of claim 1, wherein computationally searching for correlations between data type memory usage trends includes at least one of the following:
    determining a Pearson product-moment correlation coefficient for data type memory usage trends;

determining a Spearman's rank correlation coefficient for data type memory usage trends;
determining a Kendall rank correlation coefficient for data type memory usage trends;
determining a distance correlation for data type memory usage trends;
determining a distance covariance for data type memory usage trends;
determining a Brownian distance covariance for data type memory usage trends.

6. The computational process of claim 1, wherein computationally identifying respective memory usage trends includes normalizing usage statistics for the processing load.

7. The computational process of claim 1, wherein computationally grouping data types into memory-usage-trend-correlated groups includes grouping two data types which have trends that have a correlation coefficient above a predetermined threshold even though the trends have different growth rates.

8. The computational process of claim 1, wherein utilizing a result of the grouping step includes at least one of the following:
displaying data type names of data types which are in a group identified to a user as having the most memory leakage;
displaying data type names of user-defined data types which are in a group identified as having the most memory leakage of the user-defined data types;
displaying an estimated leak size for a particular data type;
displaying an estimated leak rate in memory size per unit of time for a particular data type;
displaying an estimated leaked item count for a particular data type;
displaying an estimated leak rate in item count per unit of time for a particular data type.

9. The computational process of claim 1, further comprising identifying a group of data types which all showed little or no memory leakage, then showed a spurt of leaks, and then again showed little or no memory leakage.

10. A computer-readable storage medium configured with data and with instructions that when executed by at least one processor causes the processor(s) to perform a technical process for assisting detection of memory leaks in software which has a processing load and which uses memory, the technical process comprising the steps of:
(a) obtaining memory usage data which includes memory usage samples which collectively specify a plurality of data types, each memory usage sample specifying a value of at least one usage statistic for at least one of the data types at a specified sample time;
(b) computationally identifying respective memory usage trends over time for a plurality of the data types, by processing at least part of the memory usage data with a processor;
(c) computationally searching for correlations between data type memory usage trends and one or more processing load request trends; and
(d) presenting to a user a report which includes information, based on said searching, about a correlation between data type memory usage and processing load requests.

11. The configured storage medium of claim 10, wherein the technical process further comprises restarting a software process in response to a result of said searching for correlations between data type memory usage trends and processing load request trends.

12. The configured storage medium of claim 10, wherein usage statistics for each of the data types include at least one of the following:
a count indicating how many items of the data type were allocated;
a memory size indicating how much memory was designated as allocated to items of the data type.

13. The configured storage medium of claim 10, wherein computationally searching for correlations between data type memory usage trends and processing load request trends includes at least one of the following:
determining a Pearson product-moment correlation coefficient;
determining a Spearman's rank correlation coefficient;
determining a Kendall rank correlation coefficient;
determining a distance correlation.

14. The configured storage medium of claim 10, wherein the technical process further comprises at least two of the following:
displaying an estimated leak size for a particular data type;
displaying an estimated leak rate in memory size per unit of time for a particular data type;
displaying an estimated leaked item count for a particular data type;
displaying an estimated leak rate in item count per unit of time for a particular data type;
restarting a software process in response to an estimated leaked item count;
restarting a software process in response to an estimated leak rate.

15. A memory analysis computer system which is configured with a memory analysis aid for improving the functioning of the memory analysis computer system itself or the functioning of another computer system, by assisting detection of memory leaks in software which has a processing load and which uses memory, the memory analysis computer system comprising:
a logical processor;
a memory in operable communication with the logical processor;
a trend correlation criterion residing in the memory; and
a memory analysis tool residing in the memory and having instructions executable by the processor to identify respective memory usage trends over time for a plurality of data types, search for correlations between data type memory usage trends, and group data types into memory-usage-trend-correlated groups, such that all data types in a given memory-usage-trend-correlated group have memory usage trends that satisfy the trend correlation criterion and data types whose trends do not satisfy the trend correlation criterion are not in the given memory-usage-trend-correlated group;
at least one identification by the memory analysis tool of a top leaking data type which is also identified by the memory analysis tool as being a system type rather than a user-defined type; and
at least one identification by the memory analysis tool of a top leaking data type which is also identified by the memory analysis tool as being a user-defined type rather than a system type.

16. The memory analysis computer system of claim 15, wherein the system comprises a display and the memory analysis tool includes software which displays at least two of the following items:
data type names of data types which are in a group identified to a user as having the most memory leakage;

data type names of user-defined data types which are in a group identified as having the most memory leakage of the user-defined data types;

an estimated leak size for a particular data type;

an estimated leak rate in memory size per unit of time for a particular data type;

an estimated leaked item count for a particular data type;

an estimated leak rate in item count per unit of time for a particular data type.

17. The memory analysis computer system of claim 16, wherein the memory analysis tool includes software which displays at least three of the items.

18. The memory analysis computer system of claim 15, wherein the trend correlation criterion includes a correlation threshold which has an absolute value of at least 0.45 on a correlation coefficient scale ranging from −1 to +1.

19. The memory analysis computer system of claim 15, wherein the memory analysis tool searches for correlations between data type memory usage trends at least in part by computing at least one of the following:

a Pearson product-moment correlation coefficient for data type memory usage trends;

a Spearman's rank correlation coefficient for data type memory usage trends;

a Kendall rank correlation coefficient for data type memory usage trends;

a statistically significant correlation coefficient for data type memory usage trends;

a distance correlation for data type memory usage trends.

20. The memory analysis computer system of claim 15, wherein the memory analysis tool includes a graphical user interface and software which displays graphs of data type memory usage trends.

\* \* \* \* \*